July 20, 1965 C. N. LESTAKIS 3,195,548
SEWER PIPE OPENER
Filed Jan. 16, 1964
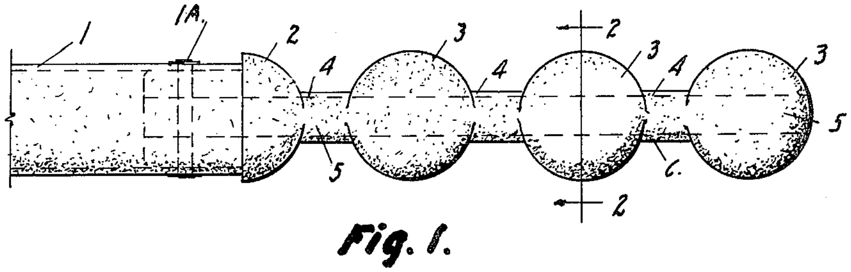
Fig. 1.
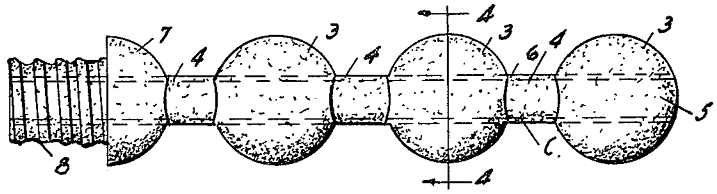
Fig. 3.
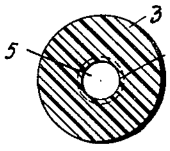
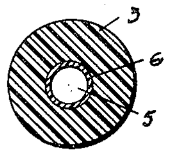
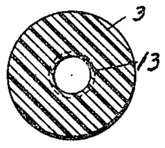
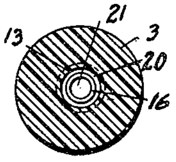
Fig. 2. Fig. 4. Fig. 6. Fig. 8.
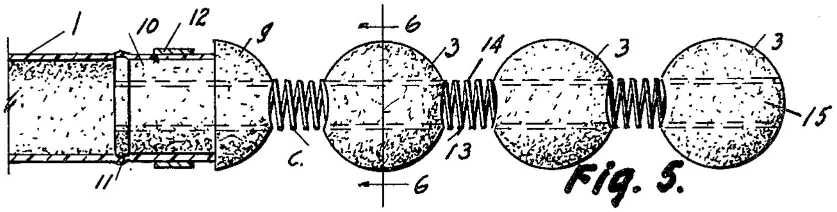
Fig. 5.
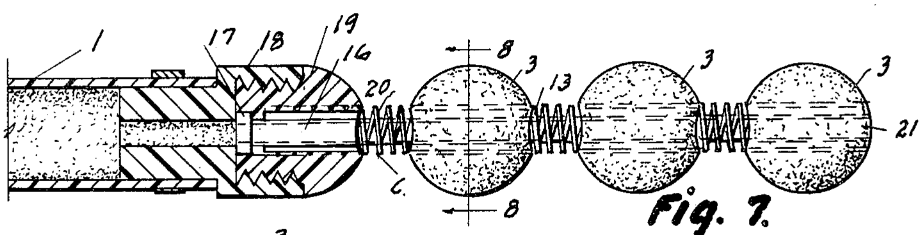
Fig. 7.
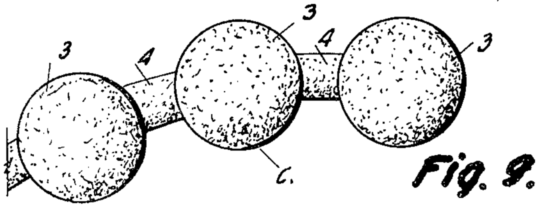
Fig. 9.
Christy N. Lestakis
Emmett G. Bock
Atty.

United States Patent Office 3,195,548
Patented July 20, 1965

1

3,195,548
SEWER PIPE OPENER

Christy N. Lestakis, 3004 27th Ave. S., Minneapolis, Minn.

Filed Jan. 16, 1964, Ser. No. 338,082
1 Claim. (Cl. 134—167)

My invention relates to a sewer pipe opener which includes a collapsible plastic hose connected at one end thereof to a source of water under pressure the other end of said hose being provided with a flexible end portion which includes a hose-engaging member, a plurality of yieldable plastic balls and means to flexibly connect the hose-engaging member and the balls in spaced apart relation in an elongated unit having a hollow core for the passage of water to engage any obstruction in the sewer pipe.

The principal object of my invention is, of course, to be able to break down the obstruction in the sewer pipe.

A second objective is to provide a means whereby water, preferably hot, may be directed at close range against the obstruction.

A third object is to provide a means whereby a collapsible plastic hose may be guided through the sewer pipe to the obstruction therein.

A fourth objective is to provide an inexpensive means which may be readily attached to the end of a collapsible plastic hose whose other end is connected to a source of water under pressure.

How these objectives are accomplished is illustrated in the accompanying drawings of which:

FIG. 1 is a side view showing the flexible end portion of my pipe opener moulded as a unit.

FIG. 2 is a vertical section on the line 2—2 of FIG. 1.

FIG. 3 is a side view showing the elements cemented to a flexible tube.

FIG. 4 is a vertical section on the line 4—4 of FIG. 3.

FIG. 5 is a side view showing the elements mounted or anchored to coil extension spring.

FIG. 6 is a vertical section on the line 6—6 of FIG. 5.

FIG. 7 is a longitudinal vertical section showing the use of a flexible tube within a coil extension spring.

FIG. 8 is a section on the line 8—8 of FIG. 7.

FIG. 9 shows how the elements of the flexible end portion may be misaligned.

Throughout the drawings and the specification similar numerals refer to similar parts.

Being the owner of a piece of property the sewer lines of which have caused me lots of grief and expense I have become thoroughly familiar with the well known "Snake" used in an attempt to open said sewer lines.

I am also aware of the patent to McKenzie, 2,246,056; the patent to Reynolds, 2,810,143; that water has been used to open an obstruction as shown in Lasting, 3,075,535; and that steam has been used to open frozen pipes as shown by Silver, 558,992. These references have many disadvantages which I seek to cure by the device I have illustrated and will now describe.

Sewer pipes vary in size from 1½" to 6" and because of their many fittings it is difficult to force a "Snake" or rubber hose through the largest size pipe. The end of the "Snake" or rubber hose is always getting hung up in making sharp turns.

My device, which I call my "DRAIN COBRA" will navigate any size pipe regardless of the fittings incorporated therein. In addition to being able to reach an obstruction I have water under pressure and may have hot water.

I use a collapsible plastic hose because it can be inflated and deflated as the need calls for in its movement through the sewer pipe. I connect one end of this hose to a source of water under pressure (not shown) preferably hot water, because grease generally accumulates at an obstruction and hot water cuts through the grease more readily than cold water does. This hot water may be taken direct from the hot water tank whose temperature ranges around 140 degrees Fahrenheit. To the other end of the hose I connect my "DRAIN COBRA" C which, in FIG. 1 consists of the hose-engaging member 2 shown riveted at 1A to the hose 1 in lieu of a bolt. Three balls 3 are shown with a necking 4 connecting the several balls and the hose-engaging member 2 into the "DRAIN COBRA" unit C. The balls 3 are made approximately 1" in diameter and the necking 4 approximately ⅜" O.D. with an ¼" hollow core 5 which extends through all the units of the "DRAIN COBRA." The balls 3 are spaced apart approximately 5⁄16". Although two or more balls may be used, three balls 3 seem to work the best and are to be preferred. The entire "DRAIN COBRA" unit C may be moulded as a unit of one of the many plastics now on the market. I have used "DELRON." However, in the type shown in FIG. 1 the necking 4 should be quite flexible and tough.

FIG. 3 shows my "DRAIN COBRA" unit built up of separately moulded elements cemented to a continuous tubing 6 which forms the necking 4 between the balls 3 and the hose-engaging member 7. This member 7 is formed with a male thread 8 to engage a female thread of a hose nipple (not shown).

FIG. 5 shows the hose-engaging member 9 formed with an end portion 10 provided with a ridge 11 over which the hose 1 is drawn and secured by the hose clamp 12. Instead of the "DRAIN COBRA" members being cemented to a tubing, said members, namely, the hose-engaging member 9 and the balls 3 are mounded to a coil extension spring 13 leaving the spring free between the balls 3 and the hose-engaging member 9 and the adjacent ball. In practice I have found a ⅜" O.D. spring wound with 0.0325 wire with the coils spaced close satisfactory. Such a spring provides a hollow core 15 for the flow of water from the hose to an obstruction in the sewer pipe.

FIG. 7 shows the same general arrangement as that shown in FIG. 5 but with a flexible tubing 16 cemented to a head 17 which is shown clamped between the hose nipple 18 and the hose-engaging member 19. The tubing 16 shown in FIG. 7 cantilevers out from its head 17 and floats in the core 20 of the coil extension spring 13. See FIG. 7. This tubing 16 should be very flexible but tough. The tube 16 forms a passage 21 for water from the hose 1 to the obstruction in the sewer pipe (not shown).

My "DRAIN COBRA" is inserted in any satisfactory opening in the sewer and is shoved forward manually. I find that I can assist the forward movement of the hose by inflating and deflating it. When the hose 1, to which the "DRAIN COBRA" is attached, must change course the balls 3 readily follow the new course. Being yieldable they readily brush by any obstruction in their advancement in any direction.

Fig. 9 shows just one of many positions the balls 3 may take.

It is quite apparent that there may be many modifications of my "DRAIN COBRA" without departing from the basic idea, therefore, I do not limit my invention but extend it to all that comes fairly within the scope of the appended claim.

What is new in the art follows.

I claim:

A sewer pipe opener having in combination a collapsible plastic hose having one end thereof adapted to be connected to a source of water under pressure and a flexible end portion which includes a hose-engaging member, an elongated coil extension spring anchored in the hose-engaging member and a plurality of yieldable plastic spherical balls through which the spring extends and to which the balls are anchored in spaced apart relation the spring being free between the balls and between the hose-engaging member and the adjacent ball the core of the spring being open to permit the movement of water from the hose to engage any obstruction in the sewer pipe.

References Cited by the Examiner

UNITED STATES PATENTS

| | | | |
|---|---|---|---|
| 271,358 | 1/83 | Pike | 134—8 |
| 335,608 | 2/86 | Messer. | |
| 1,235,878 | 8/17 | Cole | 138—119 |
| 1,469,528 | 10/23 | Owens | 138—120 |
| 1,513,228 | 10/28 | Crotto. | |
| 1,796,878 | 3/31 | Watson | 134—24 |
| 2,221,775 | 11/40 | Boynton. | |
| 2,755,810 | 7/56 | Kurt | 134—167 |
| 2,810,143 | 10/57 | Reynolds | 15—104.06 |
| 2,960,924 | 11/60 | Grott | 138—119 X |
| 3,086,540 | 4/63 | Anderson | 134—167 |

FOREIGN PATENTS

| | | |
|---|---|---|
| 678,206 | 1/64 | Canada. |
| 727,621 | 4/55 | Great Britain. |

CHARLES A. WILLMUTH, *Primary Examiner.*

GEORGE J. NORTH, *Examiner.*